(12) United States Patent
Cho et al.

(10) Patent No.: US 10,452,178 B2
(45) Date of Patent: *Oct. 22, 2019

(54) METHOD OF PROCESSING FINGERPRINT AND ELECTRONIC DEVICE THEREOF

(71) Applicant: Samsung Electronics Co., Ltd., Gyeonggi-do (KR)

(72) Inventors: Jeong-Ho Cho, Gyeonggi-do (KR); Do-Hyoung Chung, Seoul (KR); Jae-Yub Kim, Gyeonggi-do (KR); Ki-Hong Min, Seoul (KR); Seung-Geol Baek, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/643,665

(22) Filed: Jul. 7, 2017

(65) Prior Publication Data

US 2017/0308215 A1 Oct. 26, 2017

Related U.S. Application Data

(63) Continuation of application No. 14/738,086, filed on Jun. 12, 2015, now Pat. No. 9,733,740.

(30) Foreign Application Priority Data

Jun. 23, 2014 (KR) .......................... 10-2014-0076519

(51) Int. Cl.
| | |
|---|---|
| *G06F 3/041* | (2006.01) |
| *G06F 3/0488* | (2013.01) |
| *G06F 21/32* | (2013.01) |
| *G06K 9/00* | (2006.01) |
| *G06F 3/0487* | (2013.01) |

(52) U.S. Cl.
CPC .......... *G06F 3/0412* (2013.01); *G06F 3/0416* (2013.01); *G06F 3/0487* (2013.01); *G06F 3/0488* (2013.01); *G06F 3/04886* (2013.01); *G06F 21/32* (2013.01); *G06K 9/00013* (2013.01); *G06K 9/00912* (2013.01); *G06F 2203/0338* (2013.01)

(58) Field of Classification Search
CPC ............. G06F 21/32; G06F 2203/0338; G06F 3/0412; G06F 3/0416; G06F 3/0487; G06F 3/0488; G06F 3/04886; G06K 9/00013; G06K 9/00912
See application file for complete search history.

(56) References Cited

U.S. PATENT DOCUMENTS

| | | | | |
|---|---|---|---|---|
| 2014/0359758 A1* | 12/2014 | Lee | .......................... | G06F 21/30 726/19 |
| 2015/0135108 A1* | 5/2015 | Pope | .................. | G06K 9/00006 715/767 |
| 2016/0283772 A1* | 9/2016 | Nelson | .................. | G06F 3/0421 |

FOREIGN PATENT DOCUMENTS

KR 10-1231216 B1 2/2013

\* cited by examiner

*Primary Examiner* — Manuchehr Rahmjoo
(74) *Attorney, Agent, or Firm* — Cha + Reiter, LLC

(57) ABSTRACT

An electronic device and method are disclosed herein. The electronic device includes a display, a fingerprint recognition sensor configured to recognize a fingerprint received through the display, and a processor. The processor is configured to implement the method, which includes detecting a fingerprint using a fingerprint recognition sensor of the electronic device through a display of the electronic device; and controlling the display to display at least one object based on the fingerprint.

19 Claims, 13 Drawing Sheets

METHOD OF PROCESSING FINGERPRINT AND ELECTRONIC DEVICE THEREOF

CROSS REFERENCE TO RELATED APPLICATIONS

This application is a Continuation of U.S. patent application Ser. No. 14/738,086 filed on Jun. 12, 2015 which claims the priority under 35 U.S.C. § 119(a) to Korean Application Serial No. 10-2014-0076519, which was filed in the Korean Intellectual Property Office on Jun. 23, 2014, the entire content of which is hereby incorporated by reference.

TECHNICAL FIELD

The present disclosure relates to a method of processing a detected fingerprint, and an electronic device thereof.

BACKGROUND

As mobile communication technologies have developed, various types of electronic devices have been provided, such as smart phones, wearable devices, tablet PCs or the like, and various data may be transceived through the communication systems of these various electronic devices. Electronic devices may thus provide various functions, such as a call function, a text message function, an alarm function, or the like.

Some electronic devices may be set to provide a selected function when a designated pass code is input, and the pass code may be set by inputting designated fingerprint information of a user. Once the fingerprint information of a user is inputted, the electronic device may obtain and recognize fingerprint information of a finger that is in contact with a fingerprint recognition sensor included in the electronic device.

SUMMARY

When an electronic device includes a fingerprint recognition sensor, the electronic device may use a fingerprint detected through the fingerprint recognition sensor as a security key for turning on or off security settings. An electronic device may provide a method of processing an operation of detecting a fingerprint using a fingerprint recognition sensor included in a predetermined location and/or the detected fingerprint by operating in conjunction with functions provided in the electronic device, and an electronic device thereof.

In one aspect of this disclosure, an electronic device is disclosed, the device comprising a display, a fingerprint recognition sensor configured to recognize a fingerprint received through the display and a processor configured to control the display to display at least one object based on the fingerprint detected through the fingerprint recognition sensor.

In another aspect of this disclosure, a non-transitory computer-readable storage medium storing program operations, the program operations executable to cause a processor of an electronic device to detect a fingerprint through a fingerprint recognition sensor of the electronic device and control a display of the electronic device to display at least one object based on the fingerprint.

In another aspect of this disclosure, a method in an electronic device is disclosed, including detecting a fingerprint using a fingerprint recognition sensor of the electronic device through a display of the electronic device and controlling the display to display at least one object based on the fingerprint.

BRIEF DESCRIPTION OF THE DRAWINGS

The present disclosure will be more apparent from the following detailed description taken in conjunction with the accompanying drawings, in which.

DETAILED DESCRIPTION

Figure 1:
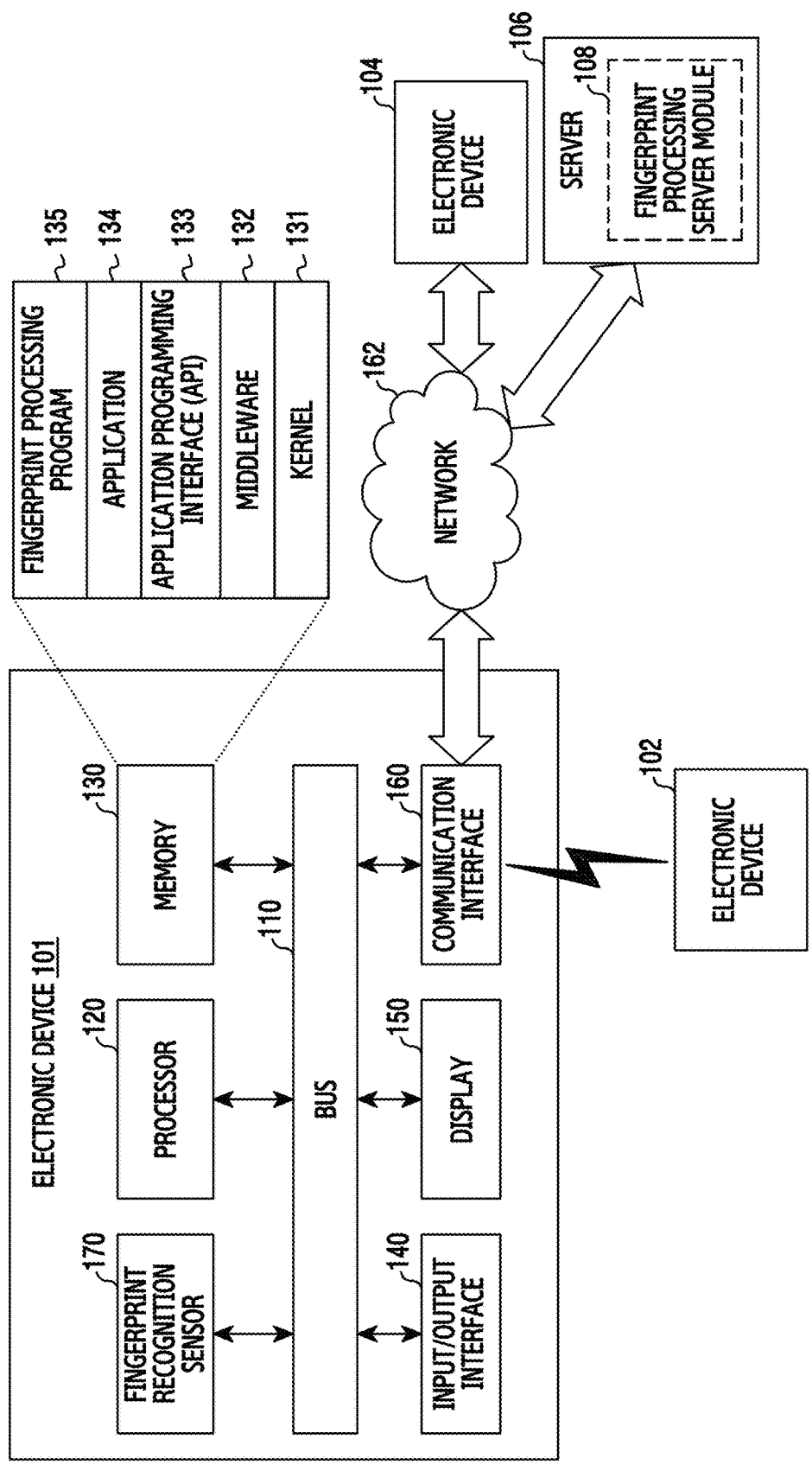
FIG. 1 illustrates a network environment including an example electronic device according to various embodiments of the present disclosure.

Hereinafter, various embodiments of the present disclosure will be described in association with the accompanying drawings.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications, equivalents, and/or alternatives of the present disclosure. In the description of the drawings, similar reference numerals may be used to designate similar elements.

As used in various embodiments of the present disclosure, the expressions "include," "may include" and other conjugates refer to the existence of a corresponding disclosed function, operation, or constituent element, and do not limit one or more additional functions, operations, or constituent elements. Further, as used in various embodiments of the present disclosure, the terms "include," "have," and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

Further, as used in various embodiments of the present disclosure, the expression "or" includes any or all combinations of words enumerated together. For example, the expression "A or B" or "at least A or/and B" may include A, may include B, or may include both A and B.

The expressions such as "first," "second," or the like used in various embodiments of the present disclosure may modify various component elements in the various embodiments but may not limit corresponding component elements. For example, the above expressions do not limit the sequence and/or importance of the elements. The expressions may be used to distinguish a component element from another component element. For example, a first user device and a second user device indicate different user devices although both of them are user devices. For example, without departing from the present disclosure, a first component element may be named a second component element. Similarly, the second component element also may be named the first component element.

When an element is referred to as being "coupled" or "connected" to any other element, it should be understood that not only the element may be coupled or connected directly to the other element, but also a third element may be interposed therebetween. Contrarily, when an element is referred to as being "directly coupled" or "directly connected" to any other element, it should be understood that no element is interposed therebetween.

The terms as used in various embodiments of the present disclosure are used merely to describe a certain embodiment and are not intended to limit the present disclosure. As used herein, singular forms may include plural forms as well unless the context explicitly indicates otherwise. Further, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

An electronic device according to embodiments of the present disclosure may be a device including a fingerprint recognition sensor. The electronic device according to various embodiments of the present disclosure may, for example, include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mount-device (HMD) such as electronic glasses, electronic clothing, an electronic bracelet, an electronic necklace, an electronic appcessory, an electronic tattoo, or a smart watch), a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an artificial intelligence robot, a Television (TV), an electronic dictionary, an electronic key, a camcorder, medical equipment (e.g., a magnetic resonance angiography (MRA) machine, a magnetic resonance imaging (MRI) machine, a computed tomography (CT) scanner, or an ultrasonic machine), a navigation device, a global positioning system (GPS) receiver, an event data recorder (EDR), a flight data recorder (FDR), a vehicle infotainment device, electronic equipment for a ship (e.g., ship navigation equipment and a gyrocompass), avionics, security equipment, an industrial or home robot, a part of furniture or building/structure, an electronic board, an electronic signature receiving device, a projector, or various measuring instruments (e.g., a water meter, an electricity meter, a gas meter, or a wave meter), each of which includes an electronic device according to embodiments of the present disclosure may be a device including a fingerprint recognition sensor. The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the aforementioned devices.

Hereinafter, an electronic device according to various embodiments of the present disclosure will be described with reference to the accompanying drawings. The term "user" as used in various embodiments of the present disclosure may indicate a person who uses an electronic device or a device (e.g., artificial intelligence electronic device) that uses an electronic device.

FIG. 1 illustrates a network environment including an example electronic device according to various embodiments of the present disclosure.

Referring to FIG. 1, the electronic device 101 may include a bus 110, a processor 120, a memory 130, an input/output interface 140, a display 150, and a communication interface 160.

The bus 110 may be a circuit that connects the aforementioned component elements to each other and transmit communication signals (for example, control messages) between the aforementioned component elements.

The processor 120 may, for example, receive commands from the above-mentioned other component elements (for example, the memory 130, the input/output interface 140, the display 150, and the communication interface 160) via the bus 110, interpret the received commands, and perform calculations or data processing based on the interpreted commands.

At least one processor 120 may be included in the electronic device 101 so as to perform designated functions of the electronic device 101. According to an embodiment of the present disclosure, the processor 120 may include at least one application processor (AP) or at least one micro controller unit (MCU). According to another embodiment of the present disclosure, the processor 210 may include at least one MCU as an application, or may be functionally connected to at least one MCU.

In FIG. 1, the AP and the MCU may be incorporated into one IC package or may be separately included in different IC packages. According to an embodiment of the present disclosure, one IC package may be configured to include MCU in the IC package of the AP. Although it is illustrated that the AP or MCU is included in the processor 210 as a component element, this is merely an example and it is apparent that the processor 120 may act as the AP and/or the MCU.

The AP may control a plurality of hardware or software component elements connected to the AP by driving an operating system or an application program (or application), and may process various data including multimedia data and perform calculations. The AP may be implemented as, for example, a system on chip (SoC). According to an embodiment of the present disclosure, the processor 210 may further include a graphic processing unit (GPU) (not illustrated).

The MCU may be a processor configured to perform designated operations. According to an embodiment of the present disclosure, the MCU may obtain sensing information through one or more designated motion sensors (for example, a gyro sensor, an acceleration sensor, or a geomagnetic sensor), may compare obtained sensing information, and may determine a motion state of a designated sensor with reference to a database of the electronic device 101.

According to an embodiment of the present disclosure, the AP or the MCU may load a command or data received from at least one of a non-volatile memory or other component elements connected to a corresponding entity, into a volatile memory, and may process the command or data loaded into the volatile memory. Further, the AP or the MCU may store data received from or generated by at least one of other component elements in a non-volatile memory.

The memory 130 (for example, the memory 230) may store commands or data received from the processor 120 or other component elements (for example, the input/output interface 140, the display 150, and the communication interface 160) or generated by the processor 120 or other elements. The memory 130 may include programming modules, for example, a kernel 131, middleware 132, an application programming interface (API) 133, an application 134, and the like. Each of the above-mentioned programming modules may be formed of software, firmware, and hardware, or a combination of two or more thereof.

The kernel 131 may control or manage system resources (for example, the bus 110, the processor 120, or the memory 130) that are used to perform operations or functions implemented in other programming modules, for example, the middleware 132, the API 133, or the application 134. Further, the kernel 131 may provide an interface through which the middleware 132, the API 133, or the application 134 may access each component element of the electronic device 101 so as to control or manage the component element.

The middleware 132 may act as an intermediary so as to allow the API 133 or the application 134 to communicate with and exchange data with the kernel 131. Further, for operation requests received from the application 134, the middleware 132 may control the operation requests (for example, perform scheduling or load balancing) by using, for example, a method of prioritizing at least one of the applications 134 in using system resources (for example, the bus 110, the processor 120, the memory 130, or the like) of the electronic device 101.

The API 133 corresponds to an interface used by the application 134 to control a function provided by the kernel 131 or the middleware 132 and may include, for example, at least one interface or function (for example, an instruction) for controlling files, windows, images, characters, and others.

According to various embodiments, the applications 134 may include a Short Message Service (SMS)/Multimedia Message Service (MMS) application, an e-mail application, a calendar application, an alarm application, a health care application (for example, an application for measuring an amount of exercise or blood sugar), and an environmental information application (for example, an application for providing information on atmospheric pressure, humidity, temperature, and the like). The application 134 may be an application that is associated with exchanging information between the electronic device 101 and an external electronic device (for example, the electronic device 102 or the electronic device 104). The application associated with exchange of information may include, for example, a notification relay application for notifying an external electronic device of certain informing or a device management application for managing an external electronic device. For example, the notification relay application may include a function of transferring, to the external electronic device (for example, the electronic device 104), notification information generated in other applications of the electronic device 101 (for example, an SMS/MMS application, an e-mail application, a health management application, an environmental information application, and the like). Additionally or alternatively, the notification relay application may receive notification information from, for example, the external electronic device (for example, the electronic device 104) and provide the received notification information to a user. For example, the device management application may manage (for example, install, delete, or update) functions for at least some of the external electronic device (for example, the electronic device 104) communicating with the electronic device 101 (for example, turning on/off the external electronic device itself (or some component elements thereof) or adjusting brightness or resolution of a display), applications operating in the external electronic device, or services (for example, a telephone call service or a message service) provided from the external electronic device. According to various embodiments of the present disclosure, the application 134 may include an application that is designated based on properties (for example, a type of an electronic device) of an external electronic device (for example, the electronic device 102 or the electronic device 104). For example, in the case where the external electronic device is an MP3 player, the application 134 may include an application related to the reproduction of music. Similarly, in the case where the external electronic device is a mobile medical appliance, the application 134 may include an application related to health care. According to an embodiment of the present disclosure, the application 134 may include at least one of an application designated in the electronic device 101 or an application received from an external electronic device (for example, a server 106 or the electronic device 104). A fingerprint processing program 135 may be provided in the application 134, or may be stored in the memory 130 as a separate program.

The input/output interface 140 may transfer an instruction or data input by a user through an input/output device (for example, various sensors such as an acceleration sensor or a gyro sensor and/or an input device such as a keyboard or a touch screen) to the processor 120, the memory 130, or the communication interface 160 through, for example, the bus 110. For example, the input/output interface 140 may provide the processor 120 with data corresponding to a user's touch input through a touch screen. Further, the input/output interface 140 may output, through an output unit (for example, a speaker or a display), a command or data, received from the processor 120, the memory 130, or the communication interface 160 through, for example, the bus 110. For example, the input/output interface 140 may output voice data processed by the processor 120 to a user through a speaker.

The display 150 may display various pieces of information (for example, multimedia data or text data) to a user. Further, the display 150 may be embodied as a touch screen into which a command is input when an input means touches or approaches the display.

The communication interface 160 (for example, the communication module 220) may establish a communication connect between the electronic device 101 and an external device (for example, the electronic device 104 or the server 106). For example, the communication interface 160 may be connected to the network 162 via wireless or wired communication so as to communicate with an external device. The wireless communication may include, for example, at least one of wireless fidelity (Wi-Fi), Bluetooth (BT), near field communication (NFC), global positioning system (GPS), or cellular communication (for example, LTE, LTE-A, CDMA, WCDMA, UMTS, WiBro, GSM or the like). The wired communication may include, for example, at least one of universal serial bus (USB), high definition multimedia interface (HDMI), recommended standard 232 (RS-232), or plain old telephone service (POTS).

According to an embodiment of the present disclosure, the network 162 may be a telecommunication network. The communication network may include at least one of a computer network, the Internet, the Internet of things, or a telephone network. According to an embodiment of the present disclosure, at least one of the application 134, the application programming interface 133, the middleware 132, the kernel 131, or the communication interface 160 may support a protocol (for example, transport layer protocol, data link layer protocol, or physical layer protocol) for communication between the electronic device 101 and an external device.

According to an embodiment of the present disclosure, the server 106 may support driving of the electronic device 101 by performing at least one operation (or function) implemented in the electronic device 101. For example, the server 106 may include the processor 120 that executes a control in the electronic device 101 to implement various embodiments of the present disclosure described below or a server module (for example, a server controller or a server processor, not illustrated) that may support a predetermined module designated to implement various embodiments. For example, the server module may include the processor 120 or at least one of the component elements of a predetermined module and thus, may execute at least one of operations that the processor 120 or the predetermined module executes (for example, may execute at least one of the operations for the processor 120 or the predetermined module). According to various embodiments of the present disclosure, the server module may be embodied as the fingerprint processing server module 108 of FIG. 1. The fingerprint processing server module 108 may receive fingerprint information (for example, a fingerprint image) from the electronic device 101. The fingerprint processing server module 108 may compare fingerprint information that the server 106 receives and at least one fingerprint information included in the server 106, and may determine a fingerprint matching a fingerprint of the received fingerprint information. The fingerprint processing server module 108 may transmit the fingerprint information of the determined fingerprint to the electronic device 101, or may transmit the fingerprint information included in the server 106 to the electronic device 101.

The fingerprint recognition sensor 170 may obtain one or more pieces of fingerprint information input into the electronic device 101, and may process the obtained fingerprint information based on a designated method. The fingerprint recognition sensor 170 may obtain fingerprint information corresponding to at least a portion of a contact area created when an input means (for example, a finger) having a fingerprint gets in contact with (or touching) a surface of the display 150 (for example, a touch screen to which an input is provided through direct touch or indirect touch). The fingerprint recognition sensor 170 may be located in the surface of the display 150. The fingerprint recognition sensor 170 may be embodied in the entire area or a designated partial area of the display 150, and may execute a control to designate the entire area or a partial area of the fingerprint recognition sensor 170 and to obtain fingerprint information from the designated area.

According to various embodiments of the present disclosure, the fingerprint recognition sensor 170 may control displaying of an object on the display, based on a fingerprint obtained thorough the fingerprint recognition sensor 170. According to an embodiment of the present disclosure, the fingerprint recognition sensor 170 may execute a control to obtain a fingerprint corresponding to a contact surface of an input means that is in contact with the display. According to an embodiment of the present disclosure, the fingerprint recognition sensor 170 may execute a control to display at least one hidden object on the display, based on a fingerprint. According to an embodiment of the present disclosure, the fingerprint recognition sensor 170 may execute a control to display at least one object on the display within a predetermined distance based on a location where a fingerprint is detected. According to an embodiment of the present disclosure, the fingerprint recognition sensor 170 may execute a control to display at least a portion of the display, which corresponds to the fingerprint recognition sensor 170. According to an embodiment of the present disclosure, the fingerprint recognition sensor 170 may select at least one of objects displayed on the display, based on a direction determined based on an obtained fingerprint or rotation of the fingerprint. According to an embodiment of the present disclosure, the fingerprint recognition sensor 170 may execute a control to sense rotation of a fingerprint, and to change a location of at least one of objects displayed on the display based on the rotation. According to an embodiment of the present disclosure, the fingerprint recognition sensor 170 may move at least one of objects clockwise or counterclockwise, based on a rotation direction of a fingerprint. According to an embodiment of the present disclosure, the fingerprint recognition sensor 170 may use an obtained fingerprint for security authentication with respect to an event corresponding to an object selected before or after a point in time of obtaining the fingerprint.

Hereinafter, at least a designated portion of the fingerprint recognition sensor 170 may be expressed as a fingerprint sensing area. In the descriptions provided below, the expression such as 'displaying a fingerprint sensing area' or 'display a fingerprint sensing area' may be an operation of the electronic device 101 for displaying, on the display 150, information associated with a designated fingerprint sensing area of the fingerprint recognition sensor 170.

The operation of the fingerprint recognition sensor 170 may be executed by the processor 120, or the processor 120 controls the fingerprint recognition sensor 170 so as to execute the operation. Hereinafter, additional information associated with the fingerprint recognition sensor 170 will be provided with reference to FIGS. 2 through 13.

Figure 2:
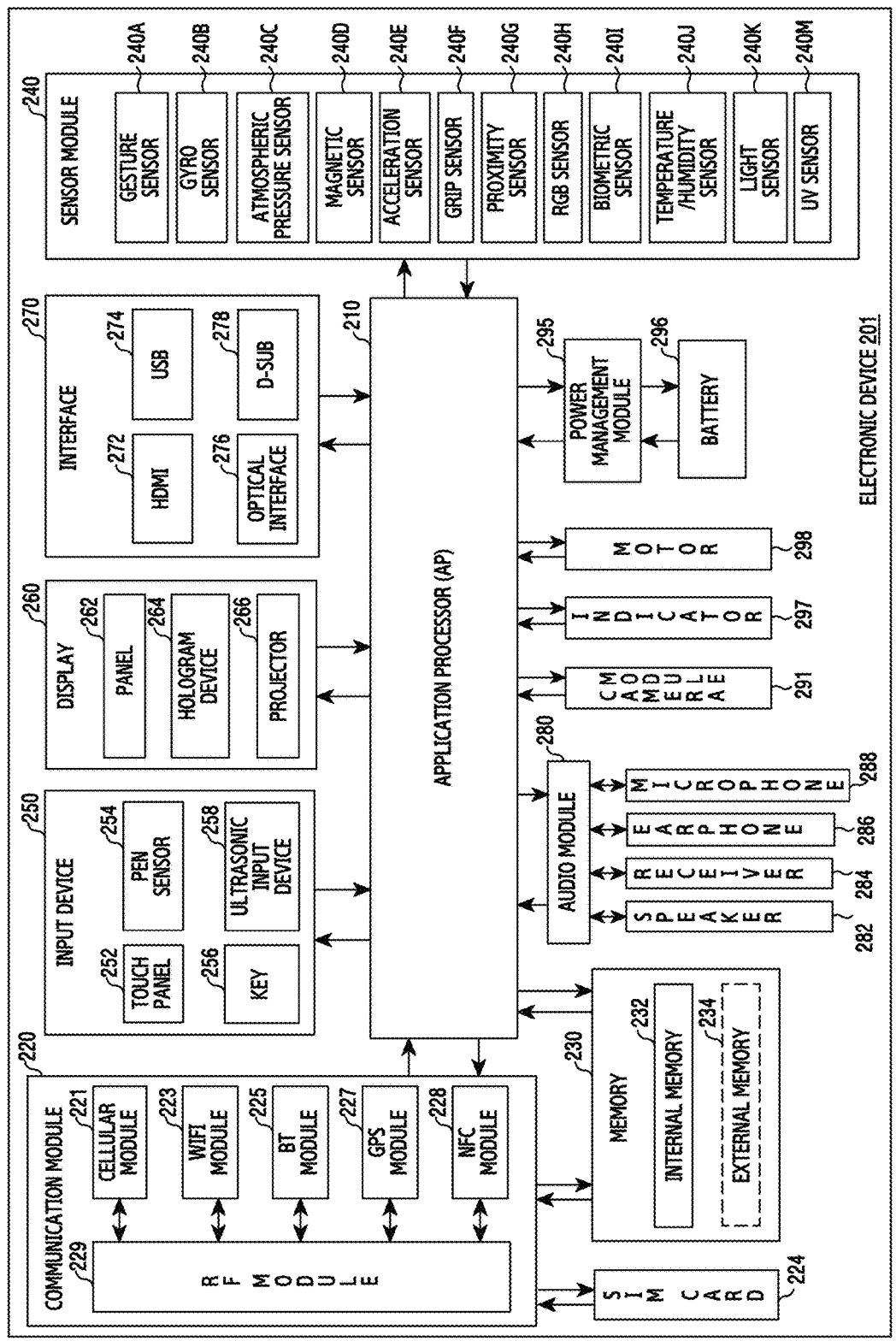
FIG. 2 is a block diagram illustrating an example electronic device according to various embodiments of the present disclosure.

FIG. 2 is a block diagram 200 of an electronic device 201 according to various embodiments of the present disclosure. The electronic device 201 configures whole or part of the electronic device 101 of FIG. 1. Referring to FIG. 2, the electronic device 201 includes one or more application processors (APs) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 controls hardware or software components connected to the AP 210 by driving an operating system or an application program, and carry out various data processing and operations including multimedia data. The AP 210 is implemented using, for example, a system on chip (SoC). The AP 210 further includes a graphic processing unit (GPU) (not shown).

The communication module 220 (such as the communication interface 160) transmits and receives data in the communication between the electronic device 201 (such as the electronic device 101) and the other electronic devices (such as the electronic device 104 or the server 106) connected over the network. The communication module 220 includes a cellular module 221, a Wi-fi module 223, a BT module 225, a GPS module 227, an NFC module 228, and a Radio Frequency (RF) module 229.

The cellular module 221 provides a voice call, a video call, a text message service, or an Internet service over the communication network (such as LTE, LTE-A, CDMA, WCDMA, UMTS, WiBro, or GSM). Also, the cellular module 221 identifies and authenticates the electronic device in the communication network using the SIM (such as the SIM card 224). The cellular module 221 performs at least part of functions provided by the AP 210. For example, the cellular module 221 performs at least part of a multimedia control function.

The cellular module 221 includes a Communication Processor (CP). The cellular module 221 is implemented using, for example, the SoC. While the components of the cellular module 221 (such as the CP), the memory 230, and the power management module 295 are separated from the AP 210 in FIG. 2, the AP 210 includes at least part (such as the cellular module 221) of the above-stated components.

The AP 210 or the cellular module 221 (such as the CP) loads and processes the instruction or the data received from its connected non-volatile memory or at least one of the other components, in a volatile memory. Also, the AP 210 or the cellular module 221 stores data received from or generated by at least one of the other components, in the non-volatile memory.

The Wi-fi module 223, the BT module 225, the GPS module 227, or the NFC module 228 each includes, for example, a processor for processing the data transmitted and received via the corresponding module. While the cellular module 221, the Wi-fi module 223, the BT module 225, the GPS module 227, and the NFC module 228 are separated from each other in FIG. 2, at least part (such as at least two) of the cellular module 221, the Wi-fi module 223, the BT module 225, the GPS module 227, and the NFC module 228 are included in a single Integrated Chip (IC) or an IC package. For example, at least part (such as the CP corresponding to the cellular module 221 and the Wi-fi processor corresponding to the Wifi module 223) of the processors corresponding to the cellular module 221, the Wi-fi module 223, the BT module 225, the GPS module 227, and the NFC module 228 are implemented using a single SoC.

The RF module 229 transmits and receives the data, for example, RF signals. The RF module 229 includes, for example, a transceiver, a Power Amp Module (PAM), a frequency filter, and a low noise amplifier (LNA), which are not shown. The RF module 229 further includes a component, for example, a conductor or a conducting wire, for sending and receiving electromagnetic waves in free space during the wireless communication. While the cellular module 221, the Wi-fi module 223, the BT module 225, the GPS module 227, and the NFC module 228 share the single RF module 229 in FIG. 2, at least one of the cellular module 221, the Wi-fi module 223, the BT module 225, the GPS module 227, and the NFC module 228 transmits and receives the RF signals via a separate RF module.

The SIM card 224 is a card including the SIM and inserted to a slot formed at a specific location of the electronic device. The SIM card 224 includes unique identification information (such as integrated circuit card identifier (ICCID)) or subscriber information (such as international mobile subscriber identity (IMSI)).

The memory 230 (such as the memory 130) includes an internal memory 232 or an external memory 234. For example, the internal memory 232 includes at least one of the volatile memory (such as dynamic RAM (DRAM), static RAM (SRAM), synchronous dynamic RAM (SDRAM)) and the non-volatile memory (such as one-time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

The internal memory 232 is a Solid State Drive (SSD). The external memory 234 includes a flash drive, for example, a Compact Flash (CF), a Secure Digital (SD), a Micro-Secure Digital (SD), a Mini-SD, an extreme digital (xD), or a memory stick. The external memory 234 is functionally connected to the electronic device 201 via various interfaces. The electronic device 201 further includes a storage device (or a storage medium) such as hard drive.

The sensor module 240 measures a physical quantity or detects an operation status of the electronic device 201, and converts the measured or detected information to an electric signal. The sensor module 240 includes at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (such as red green blue (RGB) sensor), a biometric sensor 240I, a temperature/humidity sensor 240J, a light sensor 240K, or an ultraviolet (UV) sensor 240M. The sensor module 240 includes, for example, an E-noise sensor (not shown), an electromyography (EMG) sensor (not shown), an electroencephalogram (EEG) sensor (not shown), an electrocardiogram (ECG) sensor (not shown), an infra-red (IR) sensor (not shown), an iris sensor (not shown), or a finger print sensor (not shown).

The sensor module 240 further includes a control circuit for controlling its one or more sensors.

The input device 250 includes a touch panel 252, a (digital) pen sensor 254, a key 256, and an ultrasonic input device 258. For example, the touch panel 252 recognizes touch input using at least one of capacitive, resistive, infrared, and ultrasonic wave techniques. Also, the touch panel 252 further includes a control circuit. The capacitive type recognizes physical contact or proximity. The touch panel 252 further includes a tactile layer. In certain embodiments, the touch panel 252 provides a tactile response to the user.

The (digital) pen sensor 254 is implemented using, for example, the same or similar method as or to the user's touch input, or using a separate recognition sheet. For example, the key 256 includes, for example, a physical button, an optical key, or a keypad. The ultrasonic input device 258 is a device capable of obtaining data by detecting microwaves through a microphone (such as a microphone 288) in the electronic device 201 through an input tool that generates an ultrasonic signal, allows radio frequency identification. The electronic device 201 receive user input from an external device (such as a computer or a server) connected using the communication module 220.

The display 260 (such as the display 150) includes a panel 262, a hologram device 264, or a projector 266. The panel 262 employs, for example, a liquid-crystal display (LCD) or an active-matrix organic light-emitting diode (AMOLED). The panel 262 is implemented, for example, flexibly, transparently, or wearably. The panel 262 is constructed as the single module with the touch panel 252. The hologram device 264 presents a three-dimensional image in the air using interference of light. The projector 266 displays the image by projecting the light onto a screen. The screen is placed, for example, inside or outside the electronic device 201. The display 260 further includes a control circuit for controlling the panel 262, the hologram device 264, or the projector 266.

The interface 270 includes, for example, an HDMI 272, a USB 274, an optical interface 276, or a D-subminiature (D-sub) 278. The interface 270 is included in, for example, the communication interface 160 of FIG. 1. The interface 270 includes, for example, mobile high-definition link (MHL) interface, secure digital (SD) card/multimedia card (MMC) interface, or infrared data association (IrDA) standard interface.

The audio module 280 converts sound to an electric signal and vice versa. At least part of the audio module 280 is included in, for example, the input/output interface 140 of FIG. 1. The audio module 280 processes sound information that is input or output through, for example, a speaker 282, a receiver 284, an earphone 286, or the microphone 288.

The camera module 291 is a device for capturing a still picture and a moving picture, and includes one or more image sensors (such as a front sensor or a rear sensor), a lens (not shown), an image signal processor (ISP) (not shown), or a flash (such as LED or xenon lamp) (not shown).

The power management module 295 manages power of the electronic device 201. The power management module 295 includes, although not depicted, for example, a power management integrated circuit (PMIC), a charger integrated circuit (IC), or a battery fuel gauge.

The PMIC is mounted in, for example, an IC or a SoC conductor. The charging type is divided to a wired type and a wireless type. The charger IC charges the battery and prevents overvoltage or overcurrent flow from the charger. The charger IC includes a charger IC for at least one of the wired charging type or the wireless charging type. The wireless charging type includes, for example, a magnetic resonance type, a magnetic induction type, and a microwave type and adds an additional circuit for the wireless charging, for example, a circuit such as coil loop, resonance circuit, or rectifier.

The battery gauge, for example, measures the remaining capacity of the battery 296 and the voltage, the current, or the temperature of the charging. The battery 296 stores or generates electricity, and supplies the power to the electronic device 201 using the stored or generated electricity. The battery 296 includes, for example, a rechargeable battery or a solar battery.

The indicator 297 displays a specific status of the electronic device 201 or its part (such as the AP 210), for example, booting state, message state, or charging state. The motor 298 converts the electric signal to a mechanic vibration. Although it is not depicted, the electronic device 201 includes a processing device (such as a GPU) for supporting mobile TV. The processing device for supporting the mobile TV processes media data in conformity to a standard, for example, digital multimedia broadcasting (DMB), digital video broadcasting (DVB), or media flow.

The aforementioned components of the electronic device according to various exemplary embodiments of the present disclosure each includes one or more components, and the name of the corresponding component can differ according to the type of the electronic device. The present electronic device includes at least one of the aforementioned components, omit some components, or further include other components. Some of the components of the present electronic device can be united into a single entity to thus carry out the same functions of the corresponding components.

Figure 3:
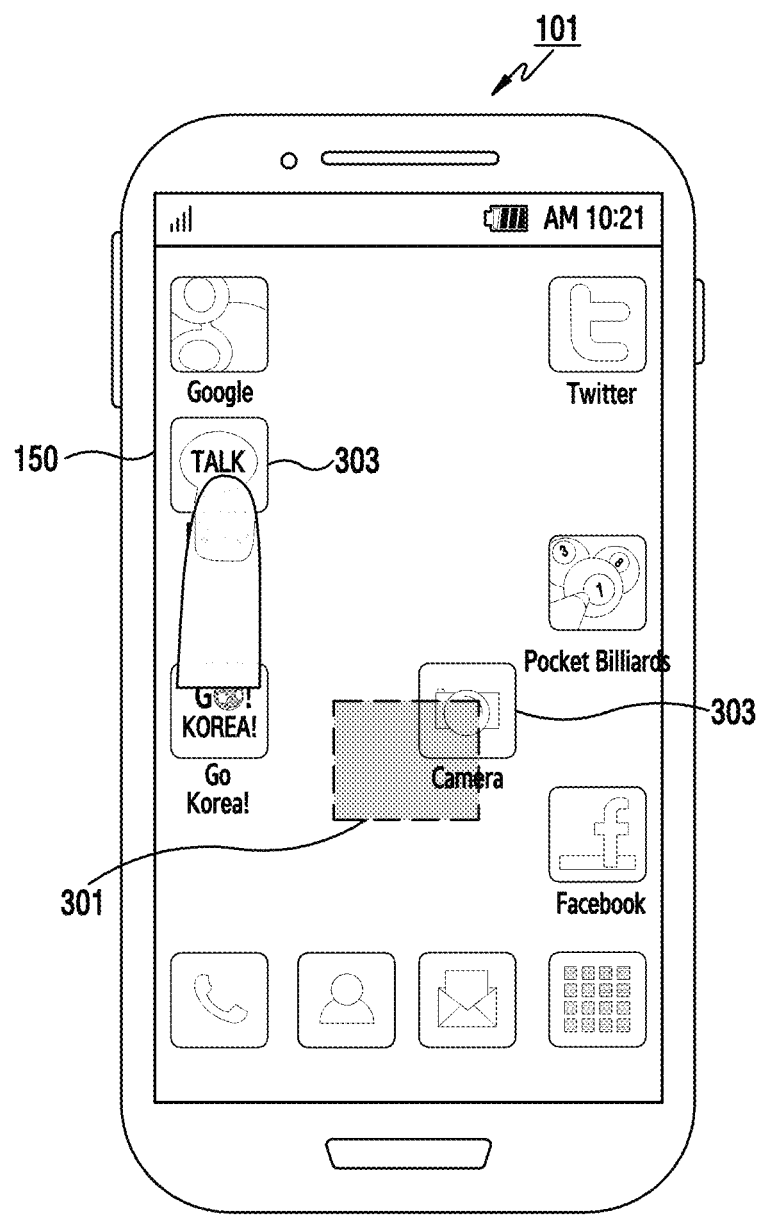
FIG. 3 is a diagram illustrating an example operation in which an electronic device activates a fingerprint recognition sensor 170 according to various embodiments of the present disclosure.

FIG. 3 is a diagram illustrating an operation in which an electronic device activates the fingerprint recognition sensor 170 according to various embodiments of the present disclosure.

According to various embodiments of the present disclosure, the electronic device 101 activates the fingerprint recognition sensor 170 that operates in conjunction with a surface of a touch input unit (for example, the touch panel 252) of the display 150 (for example, a touch screen). According to an embodiment of the present disclosure, the electronic device 101 may include the fingerprint recognition sensor 170 in a portion or the entirety of the display 150, and may activate the fingerprint recognition sensor 170 when an object set to utilize input of a fingerprint is selected. The electronic device 101 may display a designated area 301 (e.g., visually represented as a fingerprint recognition object) of the display 150, which corresponds to the activated fingerprint recognition sensor 170. In connection with operations of the electronic device 101, an operation of detecting a fingerprint of a user input through the activated fingerprint recognition sensor 170 and executing authentication based on the input fingerprint may be described as a fingerprint input function. The electronic device 101 may include two or more fingerprint recognition sensors 170 in a designated location of the display 150. The electronic device 101 may detect a sensor to be activated from among two or more fingerprint recognition sensors 170 included in the display 150, based on a state of an electronic device being held (for example, a horizontal mode or portrait mode) or information (for example, setting information) set in the electronic device 101 such as a location where a touch input is provided on the display 150. The electronic device 101 may activate the fingerprint recognition sensor 170 designated based on situation information of the electronic device 101 (for example, a state of the electronic device 101 being held or information associated with an object selected on the display 150), at a point in time of calling the fingerprint input function. The electronic device 101 may display the designated area 301 of the display 150, which corresponds to the activated fingerprint recognition sensor 170.

According to an embodiment of the present disclosure, the electronic device 101 may activate a portion of the fingerprint recognition sensor 170. For example, the electronic device 101 may include the fingerprint recognition sensor 170 in correspondence with the entire area of the display 150, so as to detect a fingerprint of an input means (for example, a finger) that provides a touch, or may include the fingerprint recognition sensor 170 in correspondence with a portion 301 of the display 150. The electronic device 101 may activate a designated part of the fingerprint recognition sensor 170 based on setting information. The electronic device 101 may display the designated area 301 of the display 150, which corresponds to an activated area of the fingerprint recognition sensor 170. Hereinafter, the activated area of the fingerprint recognition sensor 170 displayed on the display 150 is expressed as a fingerprint input area.

In connection with an operation of the display 150 and an operation of the fingerprint recognition sensor 170 that works in conjunction with the display 150, when a normal function is used (for example, the fingerprint recognition sensor 170 is in deactivated state), the electronic device 101 may operate the display 150 as usual (for example, a touch screen). According to an embodiment of the present disclosure, in the case where an object placed in a location that overlaps at least a portion of a location of the fingerprint recognition sensor 170, such as, an object 303 displayed on the display 150, is selected, when the fingerprint recognition sensor 170 is deactivated, the electronic device 101 may execute a process including determining that the object 303 is selected.

According to an embodiment of the present disclosure, in the fingerprint input function, the electronic device 101 may activate the fingerprint recognition sensor 170 in a location that overlaps a least a portion of a location of the object 303 displayed on the display 150, and may display the activated area on the display 150, as the input area 301. When an input area 301 is touched, the electronic device 101 may detect a fingerprint of an input means (for example, a fingerprint) through the fingerprint recognition sensor 170. In addition, when the input area 301 displayed on the display 150 and the object 303 partially overlap, the electronic device 101 may execute selection of the object 303 in parallel with fingerprint recognition, based on setting information.

Figure 4:
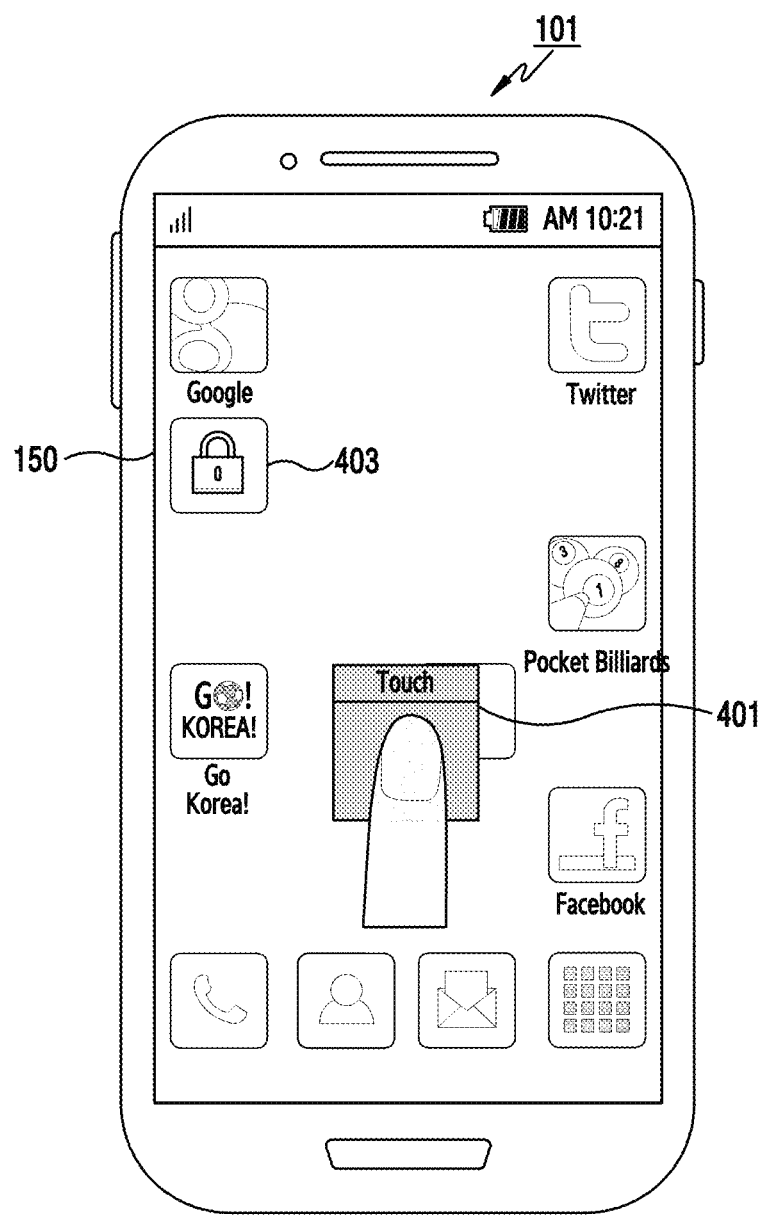
FIG. 4 is a diagram illustrating an example operation in which an electronic device inputs a fingerprint through a fingerprint recognition sensor according to various embodiments of the present disclosure.

FIG. 4 is a diagram illustrating an operation in which the example electronic device 101 inputs a fingerprint through a fingerprint recognition sensor according to various embodiments of the present disclosure.

When the electronic device 101 executes a fingerprint recognition function, the electronic device 101 may activate the fingerprint recognition sensor 170 of the electronic device 101, and may display an input area 401 (e.g., another fingerprint recognition object) in a location on the display 150 which corresponds to the fingerprint recognition sensor 170. According to an embodiment of the present disclosure, the electronic device 101 may be set (e.g., by turning on certain security settings) to execute an event corresponding to a selected object 403 when a user is authenticated by input of a predetermined fingerprint pattern.

When it is determined that the object 403 is selected, the electronic device 101 may call (e.g., activate, retrieve and/or execute) the fingerprint input function. When the electronic device 101 calls the fingerprint input function, the electronic device 101 may activate the fingerprint recognition sensor 170, and may display an input area 401 in a location on the display 150 which corresponds to the fingerprint recognition sensor 170.

When a portion of the fingerprint recognition sensor 170 is activated, the electronic device 101 may determine an area of the fingerprint recognition sensor 170 to be activated based on a location of the selected object.

According to an embodiment of the present disclosure, the electronic device 101 may activate the fingerprint recognition sensor 170 placed in a location which does not overlap at least a part of the object 403 selected on the display 150, or may activate the fingerprint recognition sensor 170 placed in a location which overlap at least a part of the object 403 selected on the display 150. The electronic device 101 may display the input area 401 in a location on the display 150, which corresponds to the location of the activated fingerprint recognition sensor 170. The electronic device 101 may detect a fingerprint of an input means that touches the input area 401. The electronic device 101 may determine a predetermined user matching a detected fingerprint, and may execute an event when the user is authenticated to execute an event corresponding to the object 403.

According to various embodiments of the present disclosure, when calling a fingerprint input function, the electronic device 101 does not limit embodiments to calling a secure event (for example, calling an event by selecting the designated object 403 corresponding an event), and may call the fingerprint input function when a designated input is determined based on setting information. For example, the electronic device 101 may activate the fingerprint recognition sensor 170 and display the fingerprint input area 401 when an input means (for example, a finger) touches a predetermined area of the display 150 at least a predetermined period of time (for example, 2 seconds). The electronic device 101 may activate the fingerprint recognition sensor 170 corresponding to a location where a touch is detected on the display 150, or may activate the fingerprint recognition sensor 170 corresponding to a location designated in setting information. The electronic device 101 may display an input area on the display 150, which corresponds to the activated fingerprint recognition sensor 170. Alternatively, when the electronic device 101 detects a designated voice input through the microphone 288, the electronic device 101 may activate the fingerprint recognition sensor 170 placed in a designated location and may display the fingerprint input area 401.

Figure 5:
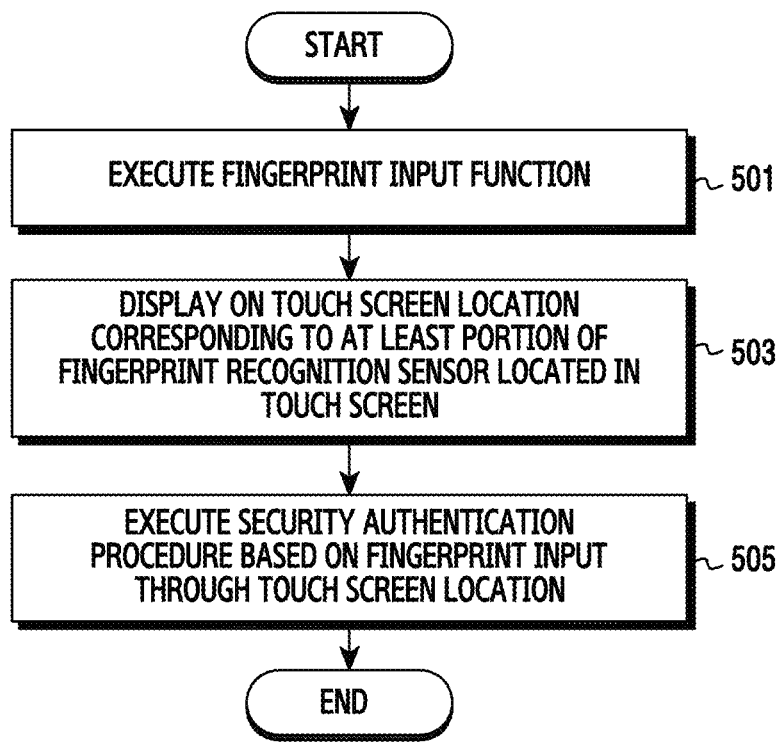
FIG. 5 is a flowchart illustrating an example operation in which an electronic device executes an event based on a detected fingerprint according to various embodiments of the present disclosure.

FIG. 5 is a flowchart illustrating an example operation in which an electronic device executes an event based on a detected fingerprint according to various embodiments of the present disclosure.

Referring to operation 501, the electronic device 101 may execute a fingerprint input function. In the process in which the electronic device 101 calls the fingerprint input function, when an input detected by the electronic device 101 is an input calling a predetermined fingerprint input, the electronic device 101 may activate the fingerprint recognition sensor 170 of the electronic device 101. Similarly, according to another embodiment of the present disclosure, when an input calling at least one event or function is detected, the electronic device 101 may determine whether the called event is secured by fingerprint information. The electronic device 101 may activate the fingerprint recognition sensor 170 of the electronic device 101 for security authentication when it is determined that the called event utilizes fingerprint authentication. The electronic device 101 is not limited to embodiments calling the fingerprint input function based on a selected object, and may also directly call a fingerprint input function when a input designated based on information set in electronic device 101 is detected.

In operation 503, the electronic device 101 displays a location of the activated fingerprint recognition sensor 170 on the display 150. According to an embodiment of the present disclosure, the fingerprint recognition sensor 170 of the electronic device 101 may be disposed as to interoperate with the display 150 that here is embodied as an example touch screen. For example, the electronic device 101 may select an object displayed on the display 150, based on an input provided through a touch on the surface of the display 150 with an input means (for example, a finger). The electronic device 101 may display, as a fingerprint input area, a location on the display 150 corresponding to the area of the activated fingerprint recognition sensor 170, which may be contained beneath the surface of the display 150 so as to obtain a fingerprint of an input means that is in contact with the surface of the display 150.

In operation 505, the electronic device 101 executes a security authentication procedure based on a fingerprint detected through the fingerprint recognition sensor 170. According to an embodiment of the present disclosure, the electronic device 101 may obtain a fingerprint of an input means that is in contact, through the activated fingerprint recognition sensor 170 in the fingerprint input area of the display 150.

In the process in which the electronic device 101 processes a touch of the input means that is in contact with the fingerprint input area, when an object that overlaps the fingerprint input area is touched while an input means gets in contact with the fingerprint input area, the electronic device 101 may not determine that the object is selected based on setting information and correspondingly executes processing. According to another embodiment of the present disclosure, the electronic device 101 may call an event corresponding to an object selected by a touch on the fingerprint input area at a point in time of obtaining, through the fingerprint recognition sensor 170, a fingerprint of an input means that is in contact with the fingerprint input area. In addition, when a fingerprint is detected through the fingerprint recognition sensor 170, the electronic device 101 may not limit embodiments to executing a designated security authentication procedure, and may include working together with at least one application included in the electronic device 101. According to an embodiment of the present disclosure, the electronic device 101 may call the fingerprint input function and may detect a designated fingerprint through the fingerprint recognition sensor 170, and may execute a control to display, on the display 150, an object that is set to call an event based on the detected fingerprint or setting information, or an object provided in a type of folder, including at least one object.

Upon completing operation 505, the electronic device 101 may end the embodiment of the present disclosure shown in FIG. 5.

Figure 6:
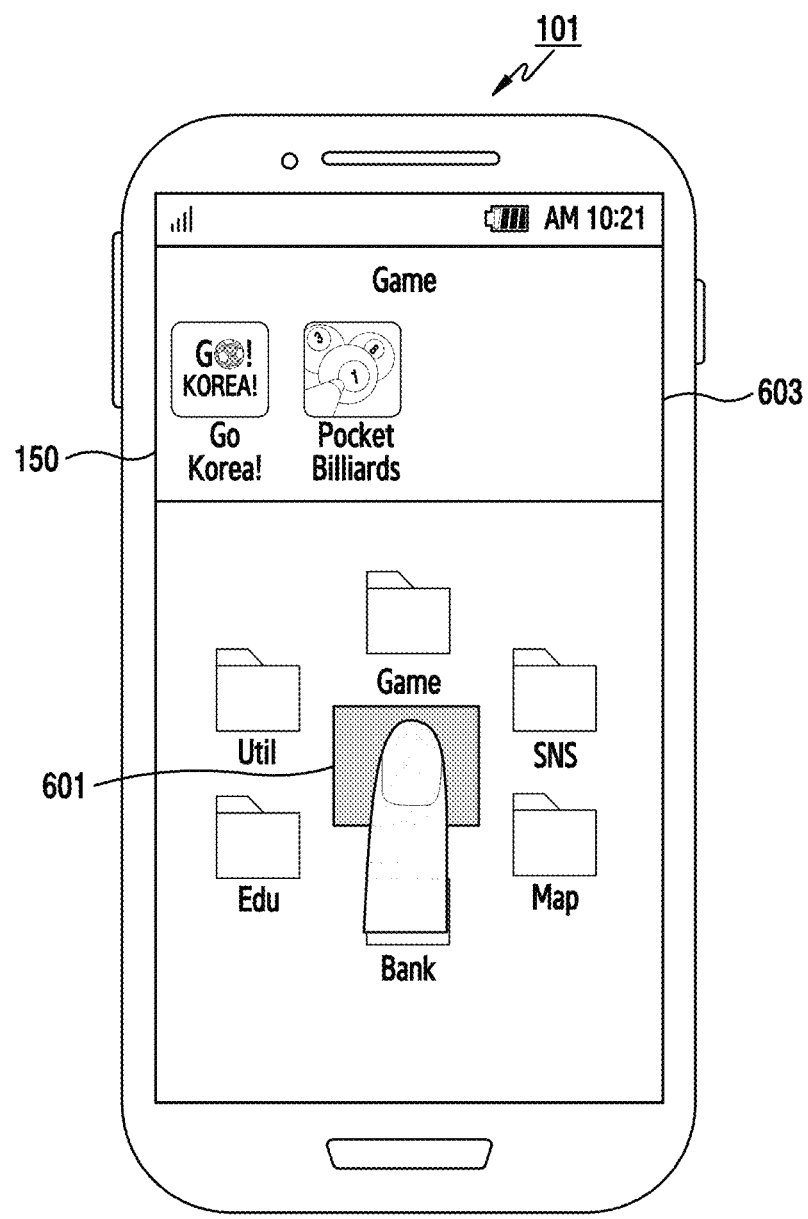
FIG. 6 is a diagram illustrating an example operation in which an electronic device calls a designated application based on a detected fingerprint according to various embodiments of the present disclosure.

FIG. 6 is a diagram illustrating an example operation in which an electronic device calls a designated application based on a detected fingerprint according to various embodiments of the present disclosure.

The electronic device 101 may call a fingerprint input function based on setting information. In addition, the electronic device 101 may execute setting so as to operate the fingerprint input function by working in conjunction with at least one application. According to an embodiment of the present disclosure, when the electronic device 101 detects that an input means contacts a fingerprint input area displayed on the display 150, the electronic device 101 may detect a fingerprint of the input means through the fingerprint recognition sensor 170. When a fingerprint is detected, the electronic device 101 may display an object that calls at least one application within a designated distance from the fingerprint input area of the display 150 (for example, within 1 cm from the fingerprint input area). In the process in which the electronic device 101 displays the object, it is apparent that the electronic device 101 displays an object provided in a type of folder, including at least one object.

Referring to FIG. 6, the electronic device 101 may display at least one object (for example, a game folder, a "util" folder, an "edu" folder, a "bank" folder, a "map" folder, or an "SNS" folder) within a designated distance from a fingerprint input area 601 of the display 150, based on the fingerprint detected through the fingerprint recognition sensor 170. In this example, a plurality of such objects are displayed within the designated distance. The electronic device 101 may select at least one object from among objects disposed based on a fingerprint input area 601, and, when the selected object is a folder, the electronic device 101 may display objects included in the folder in a designated area 603 of the display 150.

In the process in which the electronic device 101 displays the object on the display 150 based on the fingerprint detected through the fingerprint recognition sensor 170, the electronic device 101 may display an object set in user information, which corresponds to the detected fingerprint. According to an embodiment of the present disclosure, the game folder, the util folder, the edu folder, the bank folder, the map folder, or the SNS folder displayed on the display 150 of the electronic device 101 may be an object that is set to be displayed when an input means that is in contact with the fingerprint input area 601 of the display 150 is the fingerprint of the index finger of the right hand of a user who is registered under the name of Joseph.

Figure 7:
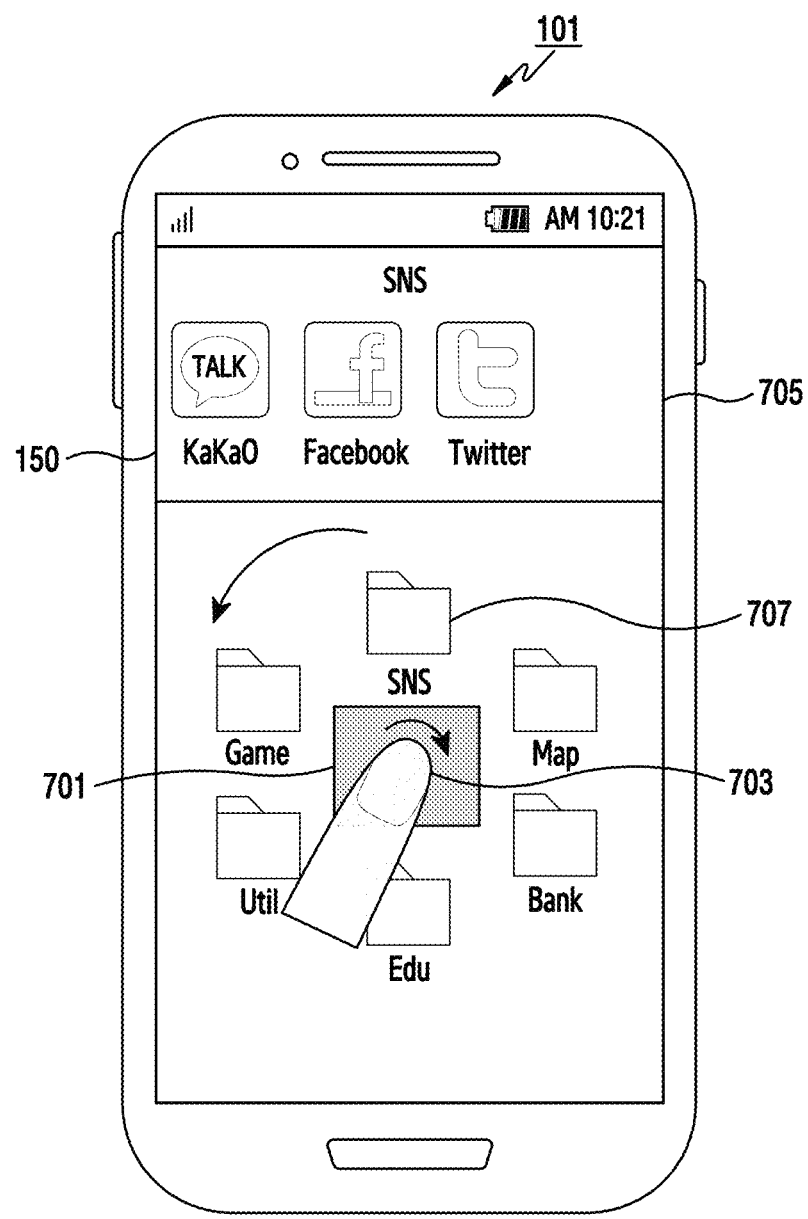
FIG. 7 is a diagram illustrating an example operation in which an electronic device selects an object based on rotation of a detected fingerprint according to various embodiments of the present disclosure.

FIG. 7 is a diagram illustrating an example operation in which an electronic device selects an object based on rotation of a detected fingerprint according to various embodiments of the present disclosure.

The electronic device 101 may sense rotation of a finger that is in contact with a fingerprint input area. According to an embodiment of the present disclosure, when a user rotates a finger that is in contact with the fingerprint input area of the display 150, the electronic device 101 may detect a change (for example, rotation) of a contact surface of a finger that is in contact with the surface of the display 150 through the fingerprint recognition sensor 170. The electronic device 101 may determine whether the change of the contact surface of the finger that is in contact with the display 150 proceeds clockwise or counterclockwise, using the fingerprint recognition sensor 170. Continuing to refer to FIG. 7, the electronic device 101 may display, in a designated area 705 (corresponding to, for example, the area 603 of FIG. 6) of the display 150, objects included in a folder (such as the game folder, shown in both FIGS. 6 and 7) displayed in a 12 o'clock direction relative to the designated area 603 in FIG. 6, from among objects disposed based on the fingerprint input area displayed on the display 150.

The electronic device 101 may sense that the finger 703 that is in contact with the fingerprint input area 701 displayed on the display 150 rotates clockwise. The electronic device 101 may move at least one object disposed according to the fingerprint input area of the display 150 clockwise or counterclockwise, and may select the folder displayed in a 12 o'clock direction in a state in which the at least one object is moved. That is, the arrangement of the objects may be altered or in this case, rotated based on the rotation of the detected fingerprint.

The electronic device 101 may display objects included in the selected folder (for example, the SNS folder 707 of FIG. 7) in a designated area 705 of the display 150. The electronic device 101 may move objects disposed based on the fingerprint input area 701 in response to detecting that the finger that is in contact with the fingerprint input area of the display 150 rotates.

According to an embodiment of the present disclosure, the electronic device 101 may determine a rotation angle of the finger that is in contact with the fingerprint input area of the display 150 through the fingerprint recognition sensor 170. The electronic device 101 may move the objects disposed based on the fingerprint input area by a designated angle based on a database, in response to the rotation angle of the finger.

In the process in which the electronic device 101 senses the rotation of the finger that is in contact with the fingerprint input area of the display 150, the electronic device 101 may not limit embodiments to sensing through the fingerprint recognition sensor 170, and may include sensing through a touch panel of the display 150.

Figure 8:
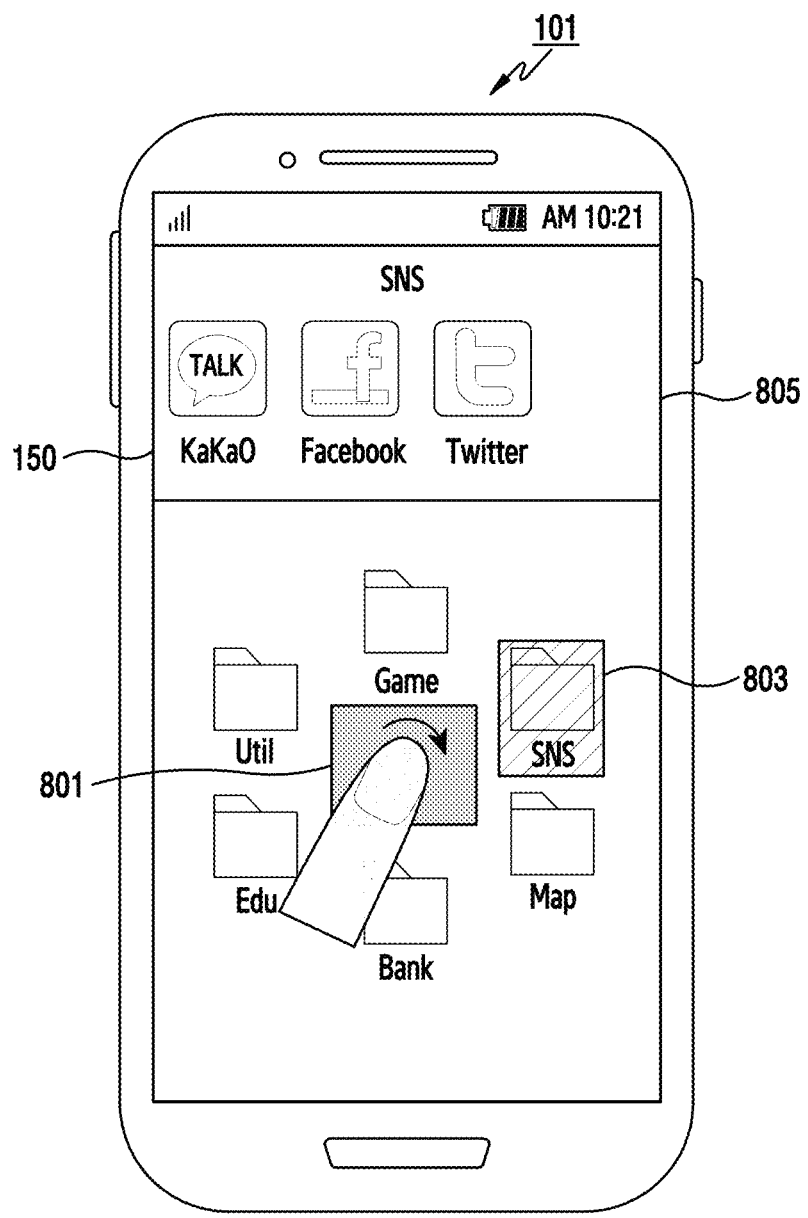
FIG. 8 is a diagram illustrating an example operation in which an electronic device selects an object based on a direction of a detected fingerprint according to various embodiments of the present disclosure.

FIG. 8 is a diagram illustrating an example operation in which an electronic device selects an object based on a direction of a detected fingerprint according to various embodiments of the present disclosure.

The electronic device 101 may sense rotation of a finger that is in contact with a fingerprint input area. According to an embodiment of the present disclosure, the electronic device 101 may determine a state in which an input means gets in contact with a fingerprint input area 801 displayed on the display 150 of the electronic device 101, based on a fingerprint detected through the fingerprint recognition sensor 170.

The electronic device 101 may select an object 803 that is located in a direction indicated by an end portion of the finger that is in contact with the fingerprint input area 801, based on a shape of the fingerprint obtained through the fingerprint recognition sensor 170. According to an embodiment of the present disclosure, the electronic device 101 may detect the fingerprint of the finger that is in contact with the fingerprint input area 801 of the display 150 through the fingerprint recognition sensor 170. The electronic device 101 may determine a direction indicated by the finger that is in contact with the fingerprint input area 801, based on a shape of the fingerprint detected through the fingerprint recognition sensor 170. For example, in the case of the finger that is in contact with the fingerprint input area 601 of FIG. 6, the electronic device 101 may determine that the finger indicates an upper portion (for example, the north or the direction of 12 o'clock) of the electronic device 101. That is, the orientation axis of the finger indicated by the direction may be used to select the SNS folder, as seen in FIG. 8.

The electronic device 101 may detect that the shape of the fingerprint that is in contact with the fingerprint input area 801 of the display 150 varies. According to an embodiment of the present disclosure, when a user rotates a finger while the user puts a finger in contact with the fingerprint input area displayed on the display 150 of the electronic device 101, the electronic device 101 may determine that the state of the fingerprint detected through the fingerprint recognition sensor 170 varies. When the electronic device 101 senses that the state of the fingerprint detected through the fingerprint recognition sensor 170 varies, the electronic device 101 may detect a corresponding fingerprint when the change occurs at designated intervals or the change is greater than or equal to a designated variation, based on setting information.

The electronic device 101 may determine a direction of a corresponding finger based the detected fingerprint. The electronic device 101 may select an object (for example, a SNS folder) corresponding to a location indicated by the direction of the fingerprint (for example, the direction of the finger). The electronic device 101 may display objects included in the selected SNS folder, in a designated area 805 of the display 150. In the process in which the electronic device 101 detects the direction of the finger that is in contact with the fingerprint input area of the display 150, the electronic device 101 may not limit embodiments to detecting through the fingerprint recognition sensor 170, and may include detecting through a touch panel of the display 150.

Figure 9:
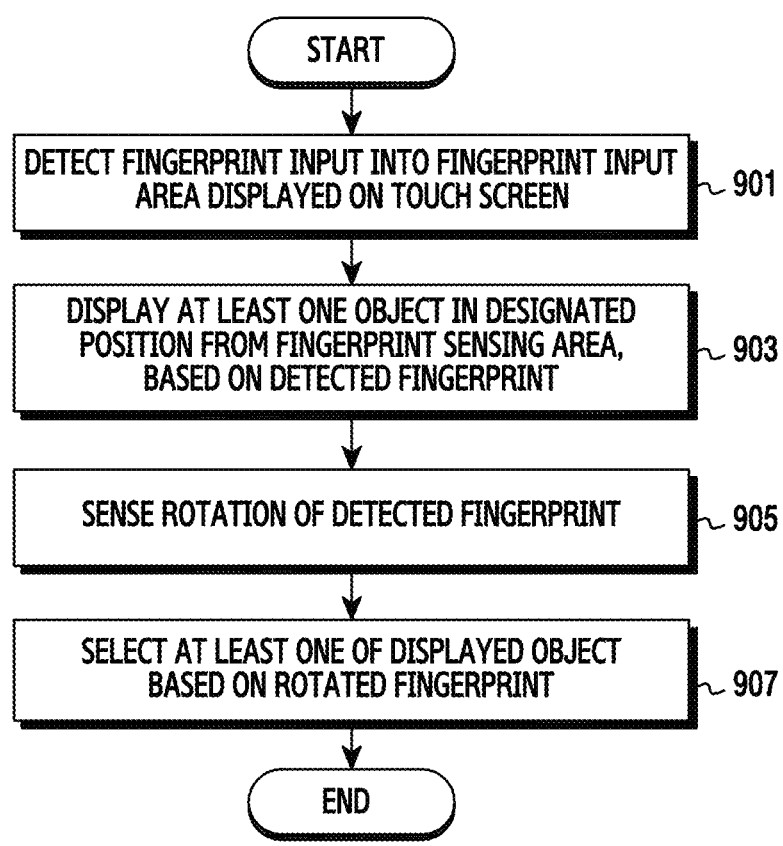
FIG. 9 is a flowchart illustrating an example operation in which an electronic device selects an object based on a detected fingerprint according to various embodiments of the present disclosure.

FIG. 9 is a flowchart illustrating an example operation in which an electronic device selects an object based on a detected fingerprint according to various embodiments of the present disclosure.

In operation 901, the electronic device 101 may detect a fingerprint through the fingerprint recognition sensor 170, based on a fingerprint input function. According to an embodiment of the present disclosure, the electronic device 101 may detect the fingerprint of a finger that is in contact with the fingerprint input area of the display 150 through the fingerprint recognition sensor 170.

In operation 903, the electronic device 101 may display at least one object based on the detected fingerprint, on the display 150. According to an embodiment of the present disclosure, the electronic device 101 may determine at least one object designated to be displayed on the display 150 based on the detected fingerprint, and may display the determined object on the display 150. The electronic device 101 may further display the at least one object in a designated location based the fingerprint input area (for example, within 2 cm of the input area). Herein, an object may refer to, for example, a graphic interface object that is displayable on the display 150, which may operate in conjunction with an application, such as, an icon, text, an emoticon, a folder, or the like.

In operation 905, the electronic device 101 may detect that a shape of the input fingerprint is being varied through the fingerprint recognition sensor 170. According to an embodiment of the present disclosure, the electronic device 101 may detect rotation of the finger that is in contact with the fingerprint input area of the display 150. When the electronic device 101 detects that the input fingerprint is rotating through the fingerprint recognition sensor 170, and the change occurs at designated intervals or the change is greater than or equal to a designated variation, the electronic device 101 may re-detect or obtain the fingerprint through the fingerprint recognition sensor 170.

In operation 907, the electronic device 101 may select at least one object displayed on the display 150 based on the rotated fingerprint. According to an embodiment of the present disclosure, the electronic device 101 may determine a direction indicated by a predetermined portion of an input means (for example, the end portion or tip of a finger), based on the obtained fingerprint. The electronic device 101 may select an object located in the direction determined based on the fingerprint from among the objects displayed on the display 150. Alternatively, the electronic device 101 may determine a degree of rotation (for example, an angle) of the obtained fingerprint, and may move the objects disposed around the fingerprint input area clockwise or counterclockwise, based on the rotation information of the fingerprint.

After the movement of the objects, the electronic device 101 may select an object located in a predetermined location (for example, an upper portion of the electronic device 101 or the direction of 12 o'clock).

Upon completing operation 907, the electronic device 101 may end the embodiment of the present disclosure shown in FIG. 9.

Figure 10:
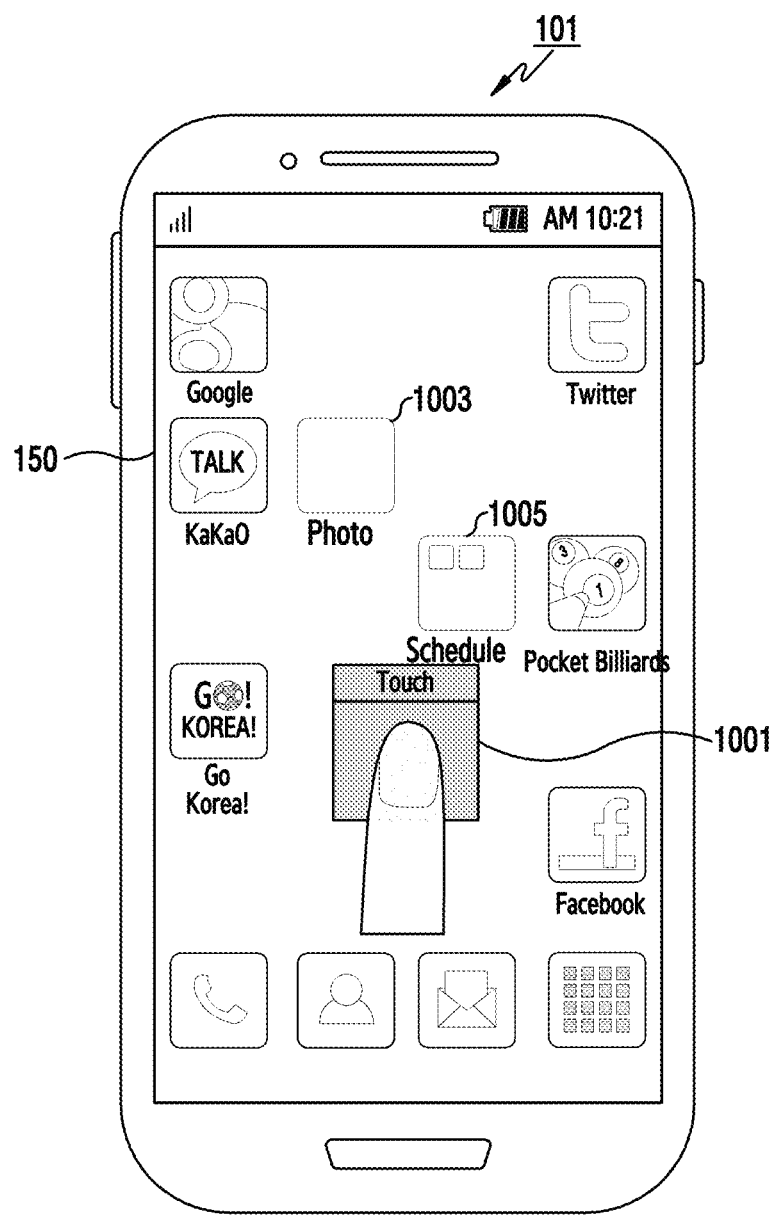
FIG. 10 is a diagram illustrating an example operation in which an electronic device displays at least one object determined based on a detected fingerprint according to various embodiments of the present disclosure.

FIG. 10 is a diagram illustrating an example operation in which an electronic device displays at least one object determined based on a detected fingerprint according to various embodiments of the present disclosure.

The electronic device 101 may be in a state of displaying at least one object on the display 150. The electronic device 101 may detect a predetermined fingerprint through a fingerprint input function. The electronic device 101 may display, on the display 150, a fingerprint input area 1001 configured to detect a fingerprint in a fingerprint input function.

The electronic device 101 may obtain a fingerprint of an input means that is in contact with the fingerprint input area 1001, through the fingerprint recognition sensor 170. The electronic device 101 may determine an image of a fingerprint that identical to the detected fingerprint, from a database of the electronic device 101. The electronic device 101 may determine at least one object based on setting information set in the determined fingerprint (or the image of the fingerprint) or setting information associated with a user corresponding to the fingerprint. The electronic device 101 may display the determined object in a designated location of the display 150.

In the process in which the electronic device 101 determines the object to be displayed based on the fingerprint, the object may be an object provided in various types or formats, such as an icon 1003 that is connected with an event that may be generated in an application or the electronic device 101, a folder 1005 including at least one icon, or the like. In addition, the object determined to be displayed in the electronic device 101 may be a hidden object which is then visibly displayed when designated security authentication is executed through a fingerprint. Further, the object determined to be displayed in the electronic device 101 may call an application or an event connected with the object through selection of the object, and may be an object set to utilize security authentication through at least one security key (for example, a security key set through a fingerprint, a password, voice or the like).

Figure 11:
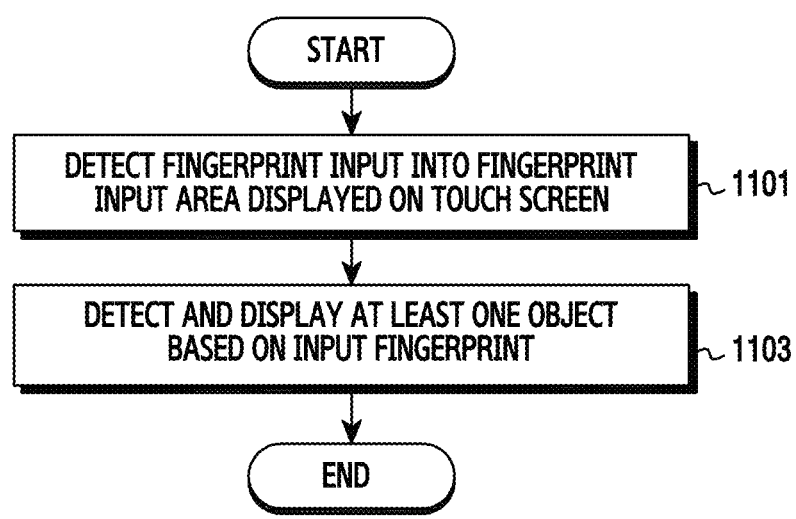
FIG. 11 is a flowchart illustrating an example operation in which an electronic device displays at least one object determined based on a detected fingerprint according to various embodiments of the present disclosure.

FIG. 11 is a flowchart illustrating an example operation in which an electronic device displays at least one object determined based on a detected fingerprint according to various embodiments of the present disclosure.

In operation 1101, the electronic device 101 may detect a fingerprint of an input means that is in contact with a fingerprint input area displayed on the display 150. According to an embodiment of the present disclosure, the electronic device 101 may detect the fingerprint through the fingerprint recognition sensor 170 of the electronic device 101 in a fingerprint input function. The electronic device 101 may display, on the display 150, an area of the fingerprint recognition sensor 170 that operates in conjunction with the display 150.

In operation 1103, the electronic device 101 may detect at least one object based on the input fingerprint, and may display the detected at least one object on the display 150. According to an embodiment of the present disclosure, the electronic device 101 may detect at least one object set based on the detected fingerprint from among objects detected to not be displayed on the display 150, and may display the determined object on the display 150. According to another embodiment of the present disclosure, the electronic device 101 may execute a security authentication procedure based on the detected fingerprint, and when the detected fingerprint is identical to a security key (for example, a password) that turns off security settings, the electronic device 101 may display at least one object hidden in the secure state, on the display 150.

Upon completing operation 1103, the electronic device 101 may end the embodiment of the present disclosure shown in FIG. 11.

Figure 12:
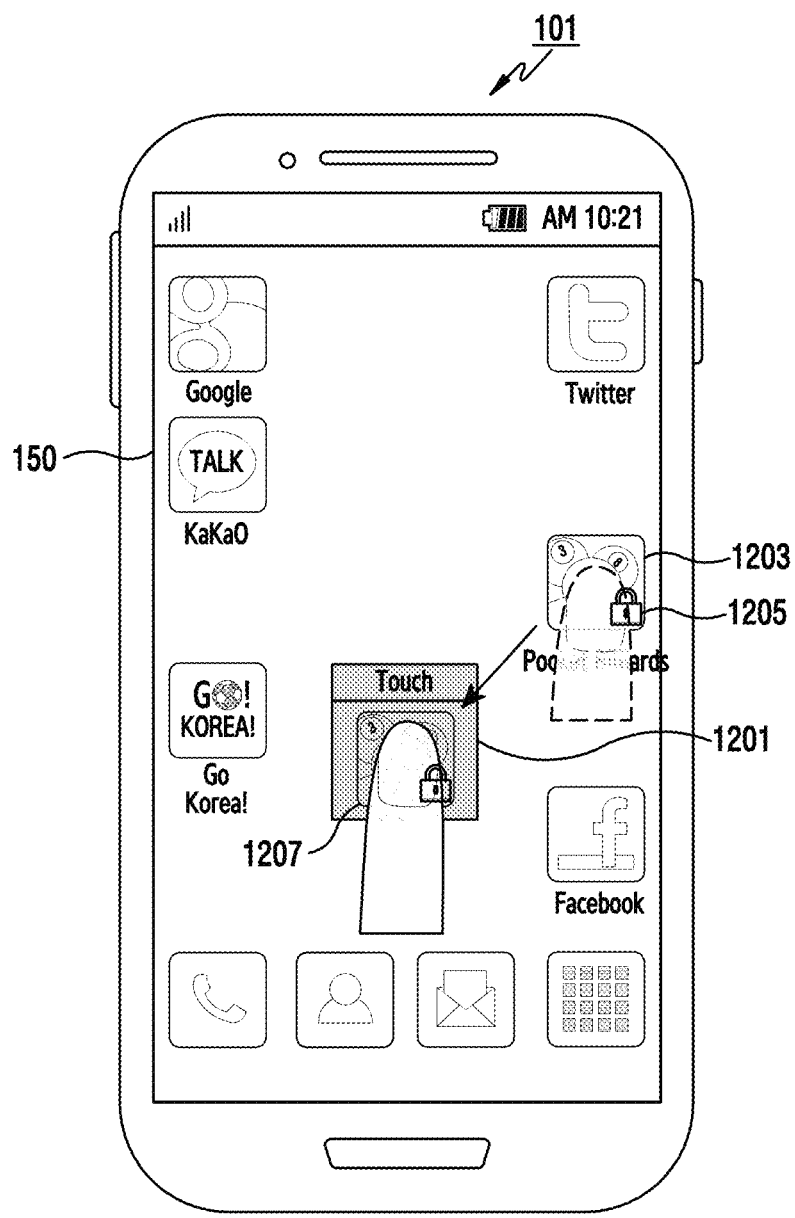
FIG. 12 is a diagram illustrating an example operation in which an electronic device selects an object displayed on a display according to various embodiments of the present disclosure.

FIG. 12 is a diagram illustrating an example operation in which an electronic device selects an object displayed on a display according to various embodiments of the present disclosure.

The electronic device 101 may display, on the display 150, at least one object 1203 connected with an application for which security settings are activated, or an event for which security settings is activated in the electronic device 101. According to an embodiment of the present disclosure, while the object 1203 is displayed, the electronic device 101 may display a graphic interface 1205 object (e.g., a lock icon) indicating that the object 1203 is in the secure state.

The electronic device 101 may detect an input operation selecting the secure object 1203 from the display 150, input operation then moving to a displayed fingerprint input area 1201. According to an embodiment of the present disclosure, the electronic device 101 may detect a touch operation on the secure object 1203 displayed on the display 150 with an input means. The electronic device 101 may detect an operation 1207 of wherein the touch operation is dragged from the secure object 1203 to the fingerprint input area 1201, or may detect an operation of removing a touch of the input means from the fingerprint input area 1201.

The electronic device 101 may detect a fingerprint corresponding to a contact surface of the input means that overlaps the fingerprint input area 1201 at a point in time of detecting the input means from the fingerprint input area 1201 of the display 150. The electronic device 101 may execute a security authentication procedure corresponding to the secure object 1203 using the fingerprint at a point in time of removing the touch of the input means from the fingerprint input area 1201. When security settings are turned off, the electronic device 101 may call an application or an event corresponding to the secure object 1203.

Figure 13:
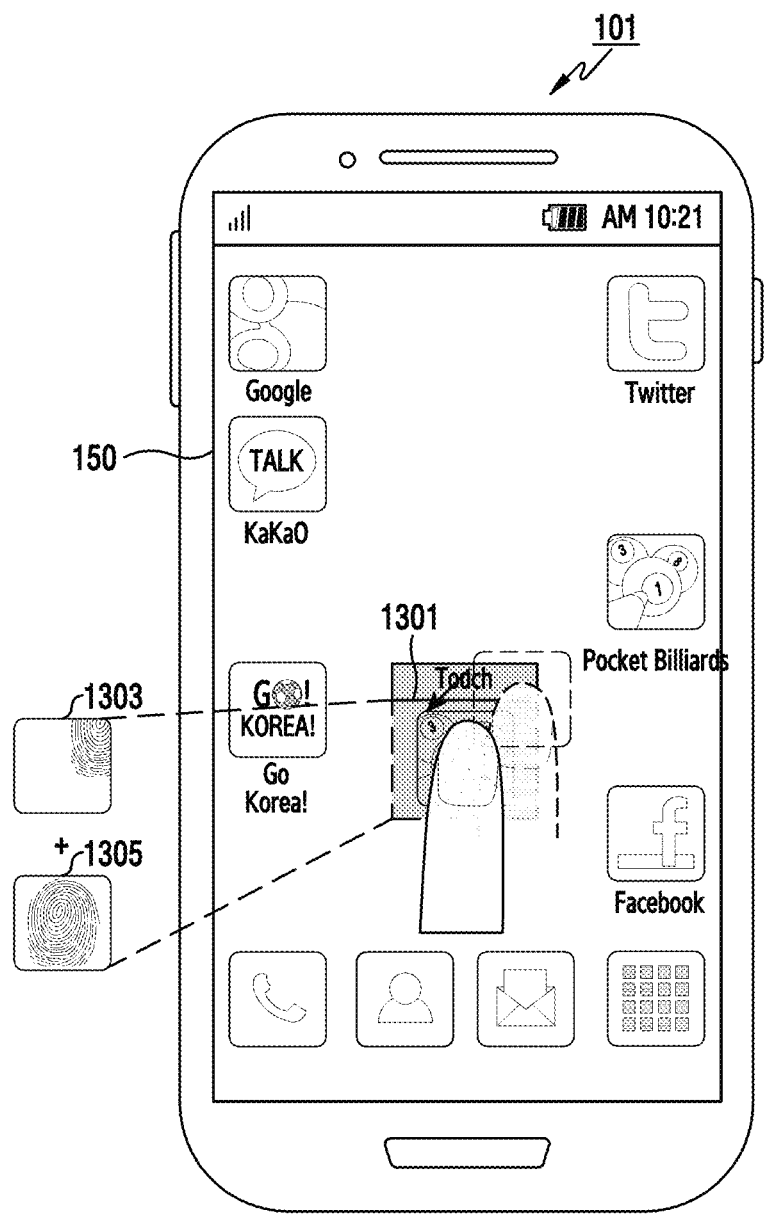
FIG. 13 is a diagram illustrating an example operation in which an example electronic device detects a fingerprint through a fingerprint input area according to various embodiments of the present disclosure.

FIG. 13 is a diagram illustrating an example operation in which an electronic device detects a fingerprint through a fingerprint input area according to various embodiments of the present disclosure.

The electronic device 101 may detect that a contact surface of an input means that is in contact with the display 150 overlaps a fingerprint sensing area 1301. According to an embodiment of the present disclosure, the electronic device 101 may detect a dragging motion that moves an object selected from among objects displayed on the display 150 to a fingerprint input area. When the contact surface of the input means that is in contact with the display 150 overlaps the fingerprint input area, while the electronic device 101 drags the selected object, the electronic device 101 may obtain a first fingerprint 1303 corresponding to the contact surface.

When the electronic device 101 detects that the contact surface of the input means that overlaps the fingerprint input area 1301 varies or changes, the electronic device 101 may additionally detect at least second fingerprint 1305. In the process in which the electronic device 101 uses the detected fingerprint for a security authentication procedure for which security is set through a fingerprint, the electronic device 101 may execute a security authentication procedure by generating a third fingerprint based on the first fingerprint 1303 and/or second fingerprint 1305. In the process in which the electronic device 101 generates the third fingerprint based on the first fingerprint 1303 and/or second fingerprint 1305, various methods such as combination, incorporation, correction, deletion, enlargement, reduction, and the like may be used.

According to various embodiments of the present disclosure, an operation method of an electronic device comprising, executing a fingerprint input function, displaying, on the touch screen, a location corresponding to at least a portion of a fingerprint recognition sensor located in a touch screen, and executing a content selected at a point in time of executing the fingerprint input function based on a fingerprint input into at least the portion.

According to various embodiments of the present disclosure, an operation method of an electronic device is provided. The method comprising, obtaining a fingerprint using a fingerprint recognition sensor that works in conjunction with a display, and displaying an object on the display, based on the fingerprint.

According to various embodiments of the present disclosure, the obtaining of the fingerprint comprises, obtaining the fingerprint corresponding a contact surface of an input means that is in contact with the display.

According to various embodiments of the present disclosure, displaying comprises, determining at least one hidden object based on the fingerprint, and displaying the hidden object on the display.

According to various embodiments of the present disclosure, displaying comprises, displaying at least one object on the display within a predetermined distance based on a location where the fingerprint is detected.

According to various embodiments of the present disclosure, displaying comprises, displaying at least a portion of the display, which corresponds to the fingerprint recognition sensor.

According to various embodiments of the present disclosure, the method further comprising, detecting rotation of the fingerprint, and selecting at least one of objects displayed on the display, based on the rotated fingerprint.

According to various embodiments of the present disclosure, the method further comprising, determining a predetermined direction based on the fingerprint, and selecting an object located in an extension line of the direction, from among objects.

According to various embodiments of the present disclosure, the method further comprising, detecting rotation of the fingerprint, and changing a location of at least one of objects displayed on the display, based on the rotation of the fingerprint.

According to various embodiments of the present disclosure, the changing comprises, moving at least one of objects clockwise or counterclockwise, based on a rotation direction of the fingerprint.

According to various embodiments of the present disclosure, the method further comprises, using the obtained fingerprint for security authentication with respect to an event corresponding to an object selected before or after a point in time of obtaining the fingerprint.

According to various embodiments of the present disclosure, the electronic device comprises, a computer readable recording medium that stores a program for implementing obtaining a fingerprint through a fingerprint recognition sensor and controlling displaying an object on a display based on the fingerprint.

Various embodiments of the present disclosure executed by the electronic device comprising, a display is configured to display an object, a fingerprint recognition sensor is configured to recognize a fingerprint by working in conjunction with the display, and at least one processor is configured to control displaying of an object on the display, based on the fingerprint obtained through the fingerprint recognition sensor.

According to various embodiments of the present disclosure, wherein the processor is configured to obtaining a fingerprint that corresponds to a contact surface of an input means that is in contact with the display.

According to an embodiment of the present disclosure, wherein the processor is configured to control displaying at least one hidden object on the display, based on a fingerprint.

According to an embodiment of the present disclosure, wherein the processor is configured to control displaying at least one object on the display within a distance based on a location where a fingerprint is detected.

According to various embodiments of the present disclosure, wherein the processor is configured to control displaying at least a portion of the display, which corresponds to the fingerprint recognition sensor.

According to an embodiment of the present disclosure, wherein the processor is configured to select at least one of objects displayed on the display, based on a direction determined based on an obtained fingerprint or rotation of the fingerprint.

According to an embodiment of the present disclosure, wherein the processor control sensing rotation of a fingerprint, and changing a location of at least one of objects displayed on the display based on the rotation.

According to an embodiment of the present disclosure, wherein the processor is configured to move at least one of objects clockwise or counterclockwise, based on a rotation direction of a fingerprint.

According to an embodiment of the present disclosure, wherein the processor is configured to use an obtained fingerprint for security authentication with respect to an event corresponding to an object selected before or after a point in time of obtaining the fingerprint.

According to various embodiments of the present disclosure, the electronic device is configured to detect a fingerprint and provide various user interfaces through a display when the display is touched based on a fingerprint recognition sensor connected with the display.

Each of the above described elements of the electronic device according to various embodiments of the present disclosure may include one or more components, and the name of a corresponding element may vary according to the type of electronic device. The electronic device according to various embodiments of the present disclosure may include at least one of the above described elements and may exclude some of the elements or further include other additional elements. Further, some of the elements of the electronic device according to various embodiments of the present disclosure may be coupled to form a single entity while performing the same functions as those of the corresponding elements before the coupling.

According to various embodiments of the present disclosure, at least some of the devices or methods according to various embodiment of the present disclosure as defined by the appended claims and/or disclosed herein may be implemented in the form of hardware, software, firmware, or any combination (e.g., module or unit) of at least two of hardware, software, and firmware. The "module" may be interchangeable with a term, such as a unit, a logic, a logical block, a component, or a circuit. The "module" may be a minimum unit of an integrated component element or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter. If implemented in software, a computer-readable storage medium (or storage medium readable by a computer) storing at least one program (or programming module) may be provided. The software may, for example, be implemented by instructions stored in a computer-readable storage medium in the form of a programming module. The at least one program may include instructions that cause the electronic device to perform the methods according to various embodiments of the present disclosure as defined by the appended claims and/or disclosed herein. When he command is executed by one or more processors (for example, the processor 120), the one or more processors may execute a function corresponding to the command. The computer-readable storage medium may, for example, be the memory 230. At least a part of the programming module may, for example, be implemented (e.g., executed) by the processor 120. At least a part of the programming module may, for example, include a module, a program, a routine, a set of instructions, or a process for performing at least one function.

According to an embodiment of the present disclosure, the electronic device 101 may include a computer readable recording medium that stores a program for implementing obtaining a fingerprint through a fingerprint recognition sensor and controlling displaying of an object on the display based on the fingerprint.

The computer-readable storage medium may include magnetic media such as a hard disc, a floppy disc, and a magnetic tape; optical media such as a compact disc read only memory (CD-ROM) and a digital versatile disc (DVD); magneto-optical media such as a floptical disk; a hardware device specifically configured to store and execute program instructions (e.g., programming module), such as a read only memory (ROM), a random access memory (RAM), and a flash memory; an electrically erasable programmable read only memory (EEPROM); a magnetic disc storage device; any other type of optical storage device; and a magnetic cassette. Alternatively, any combination of some or all of the may form a memory in which the program is stored. Further, a plurality of such memories may be included in the electronic device. In addition, the program instructions may include high class language codes, which can be executed in a computer by using an interpreter, as well as machine codes made by a compiler.

In addition, the program may be stored in an attachable storage device capable of accessing the electronic device through a communication network such as the Internet, an intranet, a local area network (LAN), a wide LAN (WLAN), a storage area network (SAN), or any combination thereof. Such a storage device may access the electronic device via an external port. Further, a separate storage device on the communication network may access a portable electronic device. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed in a different order, some of the operations may be omitted, or other operations may be added.

The embodiments of the present disclosure disclosed herein and shown in the drawings are merely specific examples presented in order to easily describe technical details of the present disclosure and to help the understanding of the present disclosure, and are not intended to limit the present disclosure. Therefore, it should be construed that, in addition to the embodiments disclosed herein, all modifications and changes or modified and changed forms derived from the technical idea of the present disclosure fall within the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA.

As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:
1. An electronic device, comprising:
a memory;
a display;
a fingerprint sensor coupled with the display and configured to generate fingerprint data by detecting a touch input on a fingerprint region of the display; and at least one processor configured to:
 display a user interface including a first object and a second object on the display,
 in response to detecting selection of the first object, control the display to display a fingerprint input image corresponding to the fingerprint region of the display, the displayed fingerprint input image providing visual guidance for receiving a touch input on the fingerprint region, wherein the displayed fingerprint input image is disposed at least partially over the second object,
 detect the touch input on the fingerprint region and the second object as guided by the displayed fingerprint input image and generate fingerprint data based on the touch input while ignoring the touch input with respect to the second object, and
 compare the generated fingerprint data with a stored fingerprint data in the memory to authenticate the generated fingerprint data, and control the display to change the displayed user interface by displaying at least one new object when the generated fingerprint data is authenticated.

2. The electronic device of claim 1, wherein the at least one processor is configured to detect a fingerprint by using the fingerprint sensor in response to detecting the touch input on the fingerprint region of the display, and generate the fingerprint data based on the detected fingerprint.

3. The electronic device of claim 2, wherein displaying the user interface including the at least one new object comprises displaying a plurality of selectable objects disposed circumferentially surrounding the fingerprint region of the display.

4. The electronic device of claim 3, wherein the at least one processor is configured to: detect selection of one of the plurality of selectable objects when an axis of the detected fingerprint is oriented towards a direction indicating a particular object of the plurality of selectable objects, or when a rotation of the touch input causes a rotation of the detected fingerprint and a rotation of the axis of the detected fingerprint, such that the axis is oriented towards the direction to indicate the particular object of the plurality of selectable objects.

5. The electronic device of claim 2, wherein a display location of the at least one new object on the display is changed in response to detecting rotation of the fingerprint detected via the touch input.

6. The electronic device of claim 5, wherein the display location is changed by moving the at least one new object in a corresponding direction around a location on the display where the touch input is detected when the detected fingerprint is rotated on the display in a clockwise or counterclockwise direction.

7. The electronic device of claim 1, wherein the at least one new object is hidden prior to authentication of the fingerprint data, the at least one processor further configured to: control the display to display the hidden at least one new object in response to detecting that the generated fingerprint data is authenticated.

8. The electronic device of claim 1, wherein the at least one processor is configured to: control the display to display the at least one new object within a predetermined distance from a location on the display where the touch input is detected.

9. The electronic device of claim 1, wherein the at least one processor is further configured to:
 detect selection of at least one object, wherein the at least one object is a secure object that requires fingerprint authentication for access,
 detect a drag input moving the at least one object to the fingerprint region indicated by the fingerprint input image, and
 permit access to the at least one object in response to detecting that the generated fingerprint data is authenticated.

10. A non-transitory computer-readable storage medium storing program operations, the program operations executable by at least one processor of an electronic device to perform operations comprising:
 displaying a user interface on a display of the electronic device, the user interface including a first object and a second object, wherein the electronic device comprises a fingerprint sensor coupled with the display;
 in response to detecting selection of the first object, controlling the display to display a fingerprint input image corresponding to a fingerprint region of the display, the displayed fingerprint input image providing visual guidance for receiving a touch input on the fingerprint region, wherein the displayed fingerprint input image is placed at least partially over the second object;
 detecting the touch input on the fingerprint region and the second object as guided by the displayed fingerprint input image, and generating fingerprint data based on the touch input while ignoring the touch input with respect to the second object; and
 comparing the generated fingerprint data with a stored fingerprint data in a memory to authenticate the generated fingerprint data, and changing the user interface by displaying at least one new object when the generated fingerprint data is authenticated.

11. A method in an electronic device, comprising:
 displaying a user interface on a display of the electronic device, the user interface including a first object and a second object, wherein the electronic device comprises a fingerprint sensor coupled with the display;
 in response to detecting selection of the first object, controlling the display to display a fingerprint input image corresponding to a fingerprint region of the display, the fingerprint input image providing visual guidance for receiving a touch input on the fingerprint region, wherein the displayed fingerprint input image is disposed at least partially over the second object;
 detecting the touch input on the fingerprint region and the second object as guided by the displayed fingerprint input image, and generating fingerprint data based on the touch input while ignoring the touch input with respect to the second object; and
 comparing the generated fingerprint data with a stored fingerprint data in a memory to authenticate the generated fingerprint data, and changing the user interface by displaying at least one new object when the generated fingerprint data is authenticated.

12. The method of claim 11, wherein controlling the fingerprint sensor to generate fingerprint data comprises:
 detecting a fingerprint by using the fingerprint sensor in response to detecting the touch input on the fingerprint region of the display; and
 generating the fingerprint data based on the detected fingerprint.

13. The method of claim 12, wherein displaying the user interface including the at least one new object comprises displaying a plurality of selectable objects disposed circumferentially surrounding the fingerprint region of the display.

14. The method of claim 13, further comprising:
   detecting selection of one of the plurality of selectable objects when an axis of the detected fingerprint is oriented towards a direction indicating a particular object of the plurality of selectable objects, or when a rotation of the touch input causes a rotation of the detected fingerprint and a rotation of the axis of the detected fingerprint, such that the axis is oriented towards the direction to indicate the particular object of the plurality of selectable objects.

15. The method of claim 12, wherein the changing the user interface comprises:
   in response to detecting a rotation of the touch input causing a rotation of the detected fingerprint, moving a display location of the at least one new object on the display.

16. The method of claim 15, wherein the moving comprises:
   in response to the rotation of the detected fingerprint in a clockwise or counterclockwise direction, moving the at least one new object in a corresponding direction around a location on the display where the touch input is detected.

17. The method of claim 11, wherein the at least one new object is hidden prior to authentication of the generated fingerprint data, the method further comprising:
   displaying the hidden at least one new object in response to the generated fingerprint data is authenticated.

18. The method of claim 11, further comprising:
   displaying the at least one new object within a predetermined distance from a location where the touch input is detected on the display.

19. The method of claim 11, further comprising:
   detecting selection of at least one object, wherein the at least one object is a secure object that requires fingerprint authentication for access;
   detecting a drag input moving the selected at least one object to the fingerprint region indicated by the fingerprint input image; and
   permitting access to the at least one object in response to detecting that the generated fingerprint data is authenticated.

* * * * *